United States Patent
Murata

(10) Patent No.: US 12,492,299 B2
(45) Date of Patent: Dec. 9, 2025

(54) RUBBER COMPOSITION AND TIRE

(71) Applicant: BRIDGESTONE CORPORATION, Tokyo (JP)

(72) Inventor: Kazuya Murata, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 838 days.

(21) Appl. No.: 17/613,596

(22) PCT Filed: Jun. 11, 2020

(86) PCT No.: PCT/JP2020/022940
§ 371 (c)(1),
(2) Date: Nov. 23, 2021

(87) PCT Pub. No.: WO2020/250956
PCT Pub. Date: Dec. 17, 2020

(65) Prior Publication Data
US 2022/0243041 A1 Aug. 4, 2022

(30) Foreign Application Priority Data
Jun. 13, 2019 (JP) .................................. 2019-110551

(51) Int. Cl.
| | |
|---|---|
| *C08L 7/00* | (2006.01) |
| *B60C 1/00* | (2006.01) |
| *C08K 3/06* | (2006.01) |
| *C08K 5/13* | (2006.01) |
| *C08K 5/18* | (2006.01) |
| *C08L 9/00* | (2006.01) |

(52) U.S. Cl.
CPC .............. *C08L 7/00* (2013.01); *B60C 1/0016* (2013.01); *B60C 1/0025* (2013.01); *C08K 3/06* (2013.01); *C08K 5/13* (2013.01); *C08K 5/18* (2013.01); *C08L 9/00* (2013.01)

(58) Field of Classification Search
CPC ....................................................... C08L 9/00
See application file for complete search history.

(56) References Cited

U.S. PATENT DOCUMENTS

| | | | |
|---|---|---|---|
| 2,830,975 A | 4/1958 | Irvin | |
| 2013/0165560 A1* | 6/2013 | Belmont | .................. C08K 9/12 |
| | | | 524/106 |
| 2016/0264688 A1* | 9/2016 | Beek | ....................... C08L 51/06 |

FOREIGN PATENT DOCUMENTS

| | | | | |
|---|---|---|---|---|
| CN | 1814641 A | 8/2006 | | |
| EP | 3476892 A1 * | 5/2019 | ............... | B60C 1/00 |
| JP | 49-105851 A | 10/1974 | | |
| JP | 2003-164546 A | 6/2003 | | |
| JP | 2009-029883 A | 2/2009 | | |
| JP | 2009-167294 A | 7/2009 | | |
| JP | 2012-062384 A | 3/2012 | | |
| JP | 2014-122297 A | 7/2014 | | |
| JP | 2015-030798 A | 2/2015 | | |
| JP | 2020-045408 A | 3/2020 | | |
| WO | 2013/046845 A1 | 4/2013 | | |

OTHER PUBLICATIONS

Extended European Search Report dated May 30, 2023 in Application No. 20822288.5.
"Practical Manual for Polymer Anti-aging," Synthetic Materials Research Institute of the Ministry of Chemical Industry, Chemical Industry Press, Jun. 1999, vol. 6 (9 pages total).
International Search Report of PCT/JP2020/022940 dated Sep. 1, 2020 [PCT/ISA/210].
Miaokui Li, Yu Jia, Xiang Gao, Zhiming Li, "University Organic Chemistry Experiment", Fudan University Press, Sep. 30, 2006 (9 pages total).
Zakharov (The Soviet Union), "New Synthetic Rubber and Its Applications", Chemical Industry Press, May 31, 1968 (9 pages total).
Search Report dated Feb. 25, 2024, issued in Chinese Application No. 202080042250.5.
Search Report only issued Feb. 20, 2023 in Chinese Application No. 2020800422505.

* cited by examiner

*Primary Examiner* — Michael F Pepitone
(74) *Attorney, Agent, or Firm* — Sughrue Mion, PLLC

(57) ABSTRACT

The present invention relates to provision of a tire in which both high mechanical strength and excellent ozone crack resistance are made compatible with each other and a rubber composition capable of producing the tire. The rubber composition contains a rubber component including a diene-based rubber, a hydroquinone compound having one alkyl group having 4 to 6 carbon atoms, and an amine-based anti-aging agent.

7 Claims, No Drawings

RUBBER COMPOSITION AND TIRE

CROSS REFERENCE TO RELATED APPLICATIONS

This application is a National Stage of International Application No. PCT/JP2020/022940 filed on Jun. 11, 2020, claiming priority based on Japanese Patent Application No. 2019-110551 filed on Jun. 13, 2019.

TECHNICAL FIELD

The present invention relates to a rubber composition and a tire.

BACKGROUND ART

For the purpose of not only contemplating to reduce a molecular weight of rubber while suppressing the generation of odor in a mastication process of a natural rubber but also preventing a viscosity of the masticated rubber from increasing with time, PTL 1 discloses that 5 to 30 parts by weight of carbon black and 0.1 to 5.0 parts by weight of a quinone-based radical scavenger are blended with 100 parts by weight of a diene-based rubber containing 50% by weight or more of a natural rubber to perform a first-stage mixing operation, thereby preparing a masticated masterbatch; and a blending agent containing carbon black but excluding a vulcanizing blending agent is blended in the masticated masterbatch to perform a second-stage mixing operation.

For the purpose of obtaining a solid golf ball which has excellent rebound characteristics and flight performance, as well as a good shot feel, PTL 2 discloses a solid golf ball including at least one layer of a core and at least one layer of a cover formed on the core, wherein at least one layer including the inmost layer of the core is formed by vulcanizing a rubber composition containing a base rubber, a co-crosslinking agent, a vulcanization initiator, and a filler, the core has a center hardness in JIS-C hardness of 40 to 60, a surface hardness in JIS-C hardness of 80 to 95, and a hardness difference (B-A) between a hardness in JIS-C hardness at a distance of 5 mm outer from the center point of the core (B) and the center hardness (A) of 1 or more and less than 10.

For the purpose of improving processability from blending to vulcanization, PTL 3 discloses a method for producing an unvulcanized rubber composition for tire containing 100 parts by weight of a rubber component composed of at least one diene-based rubber selected from a natural rubber and a synthetic polyisoprene rubber, 5 to 30 parts by weight of silica, a silane coupling agent in an amount of 3 to 15% by weight on the basis of the whole amount of silica, 0.1 to 5.0 parts by weight of a quinone-based radical scavenger, and a vulcanization blending agent, the method including a first mixing step of mixing 50 parts by weight or more of the whole amount of the rubber component, the whole amount of the silica, the whole amount of the silane coupling agent, and the whole amount of the quinone-based radical scavenger at a temperature of 110 to 160° C. to form a first mixture; a second step of adding the remaining amount of the rubber component to the first mixture at a temperature of 130 to 160° C. to form a second mixture; and a third step of adding the vulcanization blending agent to the second mixture and mixing.

For the purpose of obtaining high heat-aging resistance and weatherability, PTL 4 discloses a rubber composition for tire containing a rubber component and ubiquinol and/or ubiquinone.

PTL 5 discloses a method for performing corrosion-inhibiting vulcanization of a metal using an alkyl group-free hydroquinone, 2,3,5-trimethylhydroquinone having plural alkyl groups, etc.

CITATION LIST

Patent Literature

PTL 1: JP 2009-167294 A
PTL 2: JP 2003-164546 A
PTL 3: JP 2009-029883 A
PTL 4: JP 2012-062384 A
PTL 5: JP 49-105851 A

SUMMARY OF INVENTION

Technical Problem

Although PTLs 1 to 5 disclose various radical scavengers, a tire in which both high mechanical strength and excellent ozone crack resistance are made compatible with each other is neither disclosed nor suggested.

A problem of the present invention is to provide a tire in which both high mechanical strength and excellent ozone crack resistance are made compatible with each other and a rubber composition capable of producing the tire.

Solution to Problem

The present invention relates to the following <1> to <6>.
<1> A rubber composition containing a rubber component including a diene-based rubber, a hydroquinone compound having one alkyl group having 4 to 6 carbon atoms, and an amine-based anti-aging agent.
<2> The rubber composition as set forth in <1>, containing sulfur.
<3> The rubber composition as set forth in <1> or <2>, wherein the content of the hydroquinone compound is 0.25 to 1 part by mass based on 100 parts by mass of the rubber component.
<4> The rubber composition as set forth in any one of <1> to <3>, wherein the content of the amine-based anti-aging agent is 3 to 10 parts by mass based on 100 parts by mass of the rubber component.
<5> The rubber composition as set forth in any one of <1> to <4>, wherein the hydroquinone compound has one tert-butyl group.
<6> A tire using the rubber composition as set forth in any one of <1> to <5>.

Advantageous Effects of Invention

In accordance with the present invention, it is possible to provide a tire in which both high mechanical strength and excellent ozone crack resistance are made compatible with each other and a rubber composition capable of producing the tire.

DESCRIPTION OF EMBODIMENTS

The present invention is hereunder exemplified and described in detail based on an embodiment thereof.

In the following description, a description of "A to B" showing a numerical value range expresses a numerical value range including A and B as endpoints and expresses "A or more and B or less" (the case of A<B) or "A or less and B or more" (the case of B<A).

In addition, the terms "part by mass" and "% by mass" are synonymous with "part by weight" and "% by weight", respectively.

<Rubber Composition>

The rubber composition of the present invention contains a rubber component including a diene-based rubber, a hydroquinone compound having one alkyl group having 4 to 6 carbon atoms, and an amine-based anti-aging agent. The "hydroquinone compound having one alkyl group having 4 to 6 carbon atoms" is hereinafter occasionally referred to as "hydroquinone compound of the present invention".

The rubber composition of the present invention may further contain a filler, a vulcanizer, a vulcanization accelerator, and so on.

In view of the fact that the rubber composition of the present invention takes the aforementioned constitution, a tire in which both high mechanical strength and excellent ozone crack resistance are made compatible with each other is obtained. Although such a reason is not elucidated yet, the following reason may be assumed.

For the rubber component constituting a vulcanized rubber product, such as a case or tread of tire, a vulcanized rubber of a diene-based rubber, such as a natural rubber, a butadiene rubber, and a styrene butadiene rubber, is used. In a general vulcanized rubber material, during preservation or use of a tire, the tire occasionally reacts with ozone in the air and deteriorates to cause a crack. In general, in order to prevent a crack of the vulcanized rubber from occurring, an anti-aging agent is blended in the rubber composition, and an amine-based anti-aging agent is often used. But, though when a large quantity of the anti-aging agent is added, the crack can be prevented from occurring, on the other hand, there was a case where the anti-aging agent deposits on a surface of the vulcanized rubber to discolor the surface, thereby impairing the appearance of the vulcanized rubber product.

In the process in which ozone deteriorates the vulcanized rubber, it may be considered that breakage of rubber molecules due to radicals occurs. In the case where an anti-aging agent, such as a phenol-based anti-aging agent, a cresol-based anti-aging agent, and a hydroquinone-based anti-aging agent, is blended in the rubber component, though a deterioration preventing effect of the vulcanized rubber is obtained, radicals generated during vulcanization of the rubber component are captured, too. Therefore, there is a drawback that the progress of vulcanization is hindered, and as a result, the desired vulcanized rubber physical properties, particularly mechanical strength, cannot be obtained. Accordingly, conventionally, as the structure of the molecule, a material whose effect is suppressed by substituting the neighborhood of the hydroxy group with a bulky molecule or substituting the hydrogen of the hydroxy group with an alkyl group has been used. However, in these anti-aging agents, the effect was small, and the required ozone deterioration prevention effect which is considered to be needed was not obtained.

The purpose of adding the hydroquinone-based anti-aging agent and the phenol-based anti-aging agent is to block the reaction of automatic oxidation generated by the addition of ozone through radical trapping, thereby preventing the deterioration of the vulcanized rubber from proceeding. However, in the hydroquinone skeleton (referring to the structure of hydroquinone), in the case where no substituent is present (hydroquinone) and in the case where even if the substituent is present, its carbon number is 3 or less, the hydroxy group is not protected, so that though a radical trapping ability is strong, the vulcanization is adversely affected, and physical properties of the vulcanized rubber cannot be secured. On the other hand, in the case where the carbon number of the substituent is 7 or more and in di-substituted products or higher substituted products, the radical trapping ability is suppressed, and the hydroquinone-based anti-aging agent does not efficiently work in the situation at normal temperature or higher and 60° C. or lower where ozone deterioration occurs.

Accordingly, it may be considered that by using a mono-substituted product, more specifically by using a hydroquinone compound having one alkyl group having 4 to 6 carbon atoms in the hydroquinone skeleton, the object can be achieved.

The present invention is hereunder described in detail.

[Rubber Component]

The rubber composition of the present invention contains a rubber component including a diene-based rubber.

The diene-based rubber may be a natural rubber or may be a synthetic rubber.

Examples of the synthetic rubber include a polybutadiene rubber (BR), a polyisoprene rubber (IR), a styrene-butadiene copolymer rubber (SBR), an ethylene-propylene-diene rubber (EPDM), a chloroprene rubber (CR), a halogenated butyl rubber, and an acrylonitrile-butadiene rubber (NBR).

The diene-based rubber may be used alone or may be used in admixture of two or more thereof. A combination of a natural rubber and a synthetic rubber may also be used, and in this case, the synthetic rubber may be two or more thereof.

Above all, from the viewpoint of improving the mechanical strength and the ozone crack resistance of the vulcanized rubber, the diene-based rubber is preferably a natural rubber, a polyisoprene rubber (IR), a styrene-butadiene copolymer rubber (SBR), and a polybutadiene rubber (BR); is more preferably a natural rubber, a polyisoprene rubber (IR), and a polybutadiene rubber (BR); and is still more preferably a natural rubber and a polybutadiene rubber (BR).

In the case where the rubber component includes a natural rubber and a polybutadiene rubber (BR), the content of the polybutadiene rubber (BR) in the rubber component is preferably more than 50% by mass, and more preferably 55% by mass or more from the viewpoint of improving the mechanical strength and the ozone crack resistance of the vulcanized rubber. Although an upper limit of the content of the polybutadiene rubber (BR) in the rubber component is not particularly restricted, it is preferably 80% by mass or less, and more preferably 70% by mass or less from the viewpoint of improving the mechanical strength and the ozone crack resistance of the vulcanized rubber.

The polybutadiene rubber (BR) is preferably a high-cis-polybutadiene rubber from the viewpoint of improving the mechanical strength and the ozone crack resistance of the vulcanized rubber. The high-cis-polybutadiene rubber refers to a high-cis-polybutadiene rubber in which in the measurement with FT-IR (Fourier transform infrared spectrophotometer), the cis-1,4 bond content in the 1,3-butadiene unit is 90% or more and 99% or less. The cis-1,4 bond content in the 1,3-butadiene unit of the high-cis-polybutadiene rubber is preferably 95% or more and 99% or less.

A production method of the high-cis-polybutadiene rubber is not particularly limited, the production may be performed by a known method. Examples thereof include a method of polymerizing butadiene in the presence of a neodymium-based catalyst.

The high-cis-polybutadiene rubber is commercially available, and examples thereof include "BR01" and "T700", both being available from JSR Corporation; and "UBEPOL BR150L", available from Ube Industries, Ltd.

[Hydroquinone Compound Having One Alkyl Group Having 4 to 6 Carbon Atoms]

The rubber composition of the present invention contains a hydroquinone compound having one alkyl group having 4 to 6 carbon atoms (hydroquinone compound of the present invention).

When the rubber composition of the present invention does not contain the hydroquinone compound of the present invention, a vulcanized rubber product, such as a tire, in which both high mechanical strength and excellent ozone crack resistance are made compatible with each other, is not obtained. As already mentioned, when the hydroquinone compound does not have a substituent or does not have a substituent in the hydroquinone skeleton, or when even if the hydroquinone compound has a substituent, the carbon number of the substituent is 3 or less, the high mechanical strength cannot be realized. In addition, in the case of the carbon number of the substituent is 7 or more and in di-substituted products or higher substituted products, the ozone crack resistance cannot be realized.

In the hydroquinone compound of the present invention, the alkyl group having 4 to 6 carbon atoms may be linear, may be branched, or may be cyclic, and examples thereof include a n-butyl group, a n-heptyl group, a n-hexyl group, an isobutyl group, an isoheptyl group, an isohexyl group, a tert-butyl group, a cycloheptyl group, and a cyclohexyl group.

Above all, from the viewpoint of a balance between high mechanical strength and excellent ozone crack resistance, the carbon number of the alkyl group is preferably 4 to 5. In addition, the alkyl group is preferably branched, and more preferably a tert-butyl group. That is, the hydroquinone compound preferably has one tert-butyl group.

The content of the hydroquinone compound of the present invention in the rubber composition of the present invention is preferably 0.1 to 2 parts by mass based on 100 parts by mass of the rubber component from the viewpoint of improving the mechanical strength and the ozone crack resistance of the vulcanized rubber. When the content of the hydroquinone compound of the present invention is 0.25 parts by mass or more based on 100 parts by mass of the rubber component, the ozone crack resistance of the vulcanized rubber can be improved, and when it is 1 part by mass or less based on 100 parts by mass of the rubber component, the vulcanization of the rubber composition is hardly hindered, and a vulcanized rubber having higher mechanical strength can be obtained.

From the aforementioned viewpoint, the content of the hydroquinone compound of the present invention in the rubber composition of the present invention is more preferably 0.2 to 1.5 parts by mass, still more preferably 0.25 to 1 part by mass, and especially preferably 0.25 to 0.7 parts by mass based on 100 parts by mass of the rubber component.

[Amine-Based Anti-Aging Agent]

In order to suppress generation and progress of a crack due to ozone, the rubber composition of the present invention contains an amine-based anti-aging agent.

Examples of the amine-based anti-aging agent include N-(1,3-dimethyl-butyl)-N'-phenyl-p-phenylenediamine (occasionally referred to as "6PPD"), N-phenyl-N'-isopropyl-p-phenylenediamine, an alkylated diphenylamine, 4,4'-($\alpha$, $\alpha$-dimethylbenzyl)diphenylamine, N-phenyl-N'-(3-methacryloyloxy-2-hydroxypropyl-p-phenylenediamine, N-(1-methylheptyl)-N'-phenyl-p-phenylenediamine, phenyl-$\alpha$-naphthylamine, octylated diphenylamine and a derivative thereof, N,N'-diphenyl-p-phenylenediamine, and N,N'-di-ß-naphthyl-p-phenylenediamine. The amine-based anti-aging agent may be used alone or may be used in admixture of two or more thereof.

Above all, from the viewpoint of more improving the ozone crack resistance of the vulcanized rubber, N-(1,3-dimethyl-butyl)-N'-phenyl-p-phenylenediamine (6PPD) is preferred.

Although the content of the amine-based anti-aging agent in the rubber composition of the present invention is not particularly restricted, it is preferably 3 to 10 parts by mass, more preferably 3 to 8 parts by mass, and still more preferably 3 to 5 parts by mass based on 100 parts by mass of the rubber component from the viewpoint of more improving the ozone crack resistance of the vulcanized rubber and, on the other hand, suppressing deposition of the anti-aging agent from the vulcanized rubber.

From the viewpoint of a balance between high mechanical strength and excellent ozone crack resistance of the vulcanized rubber, the content (a) of the amine-based anti-aging agent is preferably 2 to 15, more preferably 3 to 12, still more preferably 4 to 12, and yet still more preferably 5 to 12 on a mass basis in terms of a ratio (a/b) relative to the content (b) of the hydroquinone compound of the present invention.

(Other Anti-Aging Agent)

The rubber composition of the present invention may further contain other anti-aging agent (for example, a phenol-based anti-aging agent and a quinoline-based anti-aging agent) than the hydroquinone compound and the amine-based anti-aging agent of the present invention to the extent that the effects of the present invention are not impaired.

[Other Component]

The rubber composition of the present invention may further contain other component than the aforementioned rubber component and anti-aging agent. For example, a filler, sulfur, stearic acid, zinc oxide, a vulcanization accelerator, a vulcanization retarder, a softening agent, and a wax may be appropriately selected and contained within a range where the object of the present invention is not hindered.

(Sulfur)

The rubber composition of the present invention preferably contains sulfur.

The sulfur is not particularly restricted, and examples thereof include powdery sulfur, precipitated sulfur, colloidal sulfur, surface-treated sulfur, and insoluble sulfur.

The content of the sulfur in the rubber composition of the present invention is preferably 0.1 to 5 parts by mass based on 100 parts by mass of the rubber component. When this content is 0.1 parts by mass or more, the vulcanization can be thoroughly advanced, and when it is controlled to 5 parts by mass or less, the aging resistance of the vulcanized rubber can be suppressed.

The content of the sulfur in the rubber composition is more preferably 0.5 to 3.5 parts by mass, and still more preferably 1 to 3 parts by mass based on 100 parts by mass of the rubber component.

(Vulcanization Accelerator)

The rubber composition of the present invention preferably contains a vulcanization accelerator.

Examples of the vulcanization accelerator include a guanidine-based vulcanization accelerator, an aldehyde-amine-based vulcanization accelerator, an aldehyde-ammonia-based vulcanization accelerator, a thiazole-based vulcanization accelerator, a sulfenamide-based vulcanization accelerator, a thiourea-based vulcanization accelerator, a dithiocarbamate-based vulcanization accelerator, a xanthate-based vulcanization accelerator, and a thiuram-based vulcanization accelerator. The vulcanization accelerator may be used alone or may be used in admixture of two or more thereof.

Above of all, from the viewpoint of improving the mechanical strength and the ozone crack resistance of the vulcanized rubber, the rubber composition of the present invention preferably contains at least one of a sulfenamide-based vulcanization accelerator and a thiazole-based vulcanization accelerator.

As the vulcanization accelerator, a vulcanization accelerator package may be used. The vulcanization accelerator package includes N-cyclohexyl-2-benzothiazolyl sulfenamide and di-2-benzothiazolyl disulfide.

From the viewpoint of improving the mechanical strength and the ozone crack resistance of the vulcanized rubber, the content of the vulcanization accelerator in the rubber composition of the present invention is preferably 0.1 to 5 parts by mass, more preferably 0.3 to 3 parts by mass, and still more preferably 0.5 to 2 parts by mass based on 100 parts by mass of the rubber component.

(Filler)

The rubber composition of the present invention preferably contains a filler, such as carbon black, silica, and aluminum hydroxide.

In view of the fact that the rubber composition contains the filler, the mechanical strength of the vulcanized rubber can be improved.

The carbon black is not particularly limited and can be appropriately selected according to the purpose. As the carbon black, FEF, MAF, GPF, SRF, HAF, ISAF, and SAF grades are preferred; FEF, MAF, and GPF grades are more preferred; and an FEF grade is still more preferred.

The silica is not particularly limited, and silica of a general grade and special silica having been subjected to a surface treatment with a silane coupling agent, etc. can be used according to the application. As the silica, for example, wet method silica is preferably used. In the case where the filler contains silica, from the viewpoint of more improving the mechanical strength of the vulcanized rubber, the rubber composition is preferably blended with a silane coupling agent.

The filler may be used alone or may be used in combination of two or more thereof.

The content of the filler in the rubber composition is preferably 10 to 70 parts by mass, more preferably 20 to 60 parts by mass, and still more preferably 25 to 50 parts by mass based on 100 parts by mass of the rubber component.

(Softening Agent)

The rubber composition of the present invention preferably contains a softening agent.

Examples of the softening agent include process oils, such as a mineral oil derived from a mineral, an aromatic oil, a paraffin oil and a naphthene oil, derived from petroleum, and a palm oil derived from a natural material. Of these, a softening agent derived from a mineral and a process oil derived from petroleum are preferably used from the viewpoint of improving the wet grip performance of a tire.

The softening agent may be used alone or may be used in combination of two or more thereof.

The content of the softening agent in the rubber composition is preferably 1 to 10 parts by mass, more preferably 2 to 8 parts by mass, and still more preferably 2 to 6 parts by mass based on 100 parts by mass of the rubber component.

<Preparation of Rubber Composition>

The rubber composition of the present invention can be produced by blending the aforementioned respective components and kneading them using a kneader, such as a Banbury mixer, a roll, and an internal mixer. The blending amount of each of the components is the same as the amount mentioned above as the content in the rubber composition.

The kneading of the respective components may be performed entirely at one stage or divided into two or more stages. For example, there is exemplified a method in which blending the components other than sulfur and an expanding agent are kneaded at a first stage, and the sulfur and the expanding agent are kneaded at a second stage. In addition, the same components may be added at divided plural stages and kneaded.

A maximum temperature of the first stage of kneading is preferably 130 to 170° C., and a maximum temperature of the second stage is preferably 90 to 120° C.

<Tire>

The tire of the present invention is made by using the rubber composition of the present invention.

The rubber composition of the present invention is used for various vulcanized rubber products and is suitable as a case, a tread member, etc. of a tire (pneumatic tire).

Examples of a gas which is filled in the tire include typical air or air whose oxygen partial pressure is adjusted and besides, inert gases, such as nitrogen, argon, and helium.

In the case where the rubber composition of the present invention is used for a tire, it is not limited to a tread member of the tire, but it may be used for a base tread, a sidewall, a side reinforcing rubber, a bead filler, etc.

In addition to tire applications, the rubber composition of the present invention can be used for an anti-vibration rubber, a seismic isolation rubber, a belt (conveyor belts), a rubber crawler, a variety of hoses, a moran, etc.

EXAMPLES

The present invention is hereunder described in more detail by reference to Examples, but it should be construed that the present invention is by no means limited to the following Examples.

<Preparation of Rubber Composition and Evaluation of Vulcanized Rubber>

Examples 1 to 3 and Comparative Examples 1 to 12

In the blending formulations shown in Tables 1 and 2, the blending components of the rubber composition were kneaded using a Banbury mixer, thereby preparing sample rubber compositions (Examples 1 to 3 and Comparative Examples 1, 4 to 7, and 11 to 12).

Each of obtained rubber compositions was vulcanized at 160° C. for 15 minutes to fabricate a vulcanized rubber, and using the vulcanized rubber, the mechanical strength and the ozone crack resistance were evaluated.

Rubber compositions of Comparative Examples 2 to 3 and 8 to 10 and evaluation results thereof are prediction data predicted using a calibration curve obtained from experimental data.

[Blending Components of Rubber Composition]

The components shown Tables 1 and 2 are as follows.

Natural rubber: TSR 20

Polybutadiene rubber: a trade name: "UBEPOL BR150L", available from Ube Industries, Ltd.

Carbon black: N550 (FEF), a trade name: "ASAHI #65", available from Asahi Carbon Co., Ltd.

Microcrystalline wax: a trade name: "SUNTIGHT A", available from Seiko Chemical Co., Ltd.

Hydroquinone compound 1: tert-Butylhydroquinone, available from Tokyo Chemical Industry Co., Ltd.

Hydroquinone compound 2: Phenylhydroquinone, available from Tokyo Chemical Industry Co., Ltd.

Hydroquinone compound 3: Hydroquinone, available from Tokyo Chemical Industry Co., Ltd.

Hydroquinone compound 4: 2,5-Di-tert-butylhydroquinone, available from Tokyo Chemical Industry Co., Ltd.

Hydroquinone compound 5: 2,5-Di-tert-amylhydroquinone, available from Tokyo Chemical Industry Co., Ltd.

Hydroquinone compound 6: Methylhydroquinone, available from Tokyo Chemical Industry Co., Ltd.

Hydroquinone compound 7: 2,5-Bis(1,1,3,3-tetramethylbutyl)hydroquinone, available from Wako Pure Chemical Industries, Ltd.

Hydroquinone compound 8: Tetramethylhydroquinone, available from Tokyo Chemical Industry Co., Ltd.

Hydroquinone compound 9: Hydroquinone monomethyl ether, available from Tokyo Chemical Industry Co., Ltd.

Phenol-based anti-aging agent: 2,6-Di-tert-butyl-4-methylphenol: a trade name: "ANTAGE BHT", available from Kawaguchi Chemical Industry Co., Ltd.

Structural formulae of the aforementioned hydroquinone compounds and phenol-based anti-aging agent are as follows.

Hydroquinone compound 1

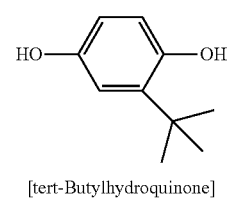

[tert-Butylhydroquinone]

Hydroquinone compound 2

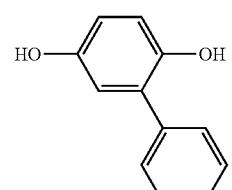

[Phenylhydroquinone]

Hydroquinone compound 3

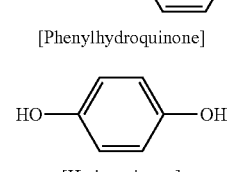

[Hydroquinone]

Hydroquinone compound 4

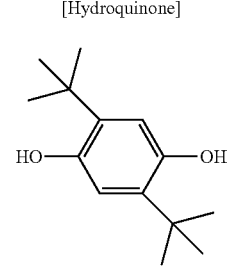

[2,5-Di-tert-butylhydroquinone]

Hydroquinone compound 5

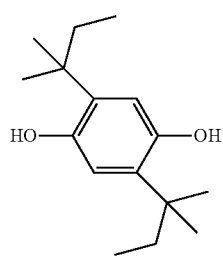

[2,5-Di-tert-amylhydroquinone]

Hydroquinone compound 6

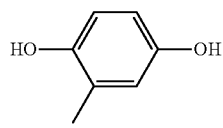

[Methylhydroquinone]

Hydroquinone compound 7

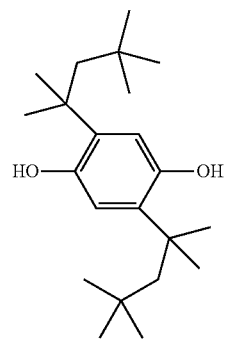

[2,5-Bis(1,1,3,3-tetramethylbutyl)hydroquinone]

Hydroquinone compound 8

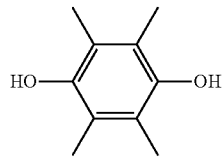

[Tetramethylhydroquinone]

Hydroquinone compound 9

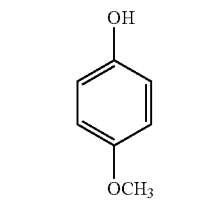

[Hydroquinone monomethyl ether]

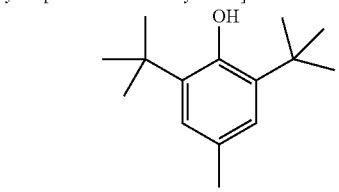

Phenol-based anti-aging agent:
2,6-Di-tert-butyl-4-methylphenol

Process oil: a trade name: [A/O MIX], available from JXTG

Stearic acid: a trade name: "50S", available from New Japan Chemical Co., Ltd.

Zinc oxide (at the first stage of kneading): Zinc oxide #2, as classified according to the JIS standards Amine-based anti-aging agent: 6PPD [N-(1,3-Dimethylbutyl)-N'-phenyl-p-phenylenediamine], a trade name: "ANTAGE 6C", available from Kawaguchi Chemical Industry Co., Ltd.

Vulcanization retarder: a trade name: "NISSEKI NEO RESIN B-100", available from New Japan Chemical Co., Ltd.

A structural formula of the amine-based anti-aging agent is as follows.

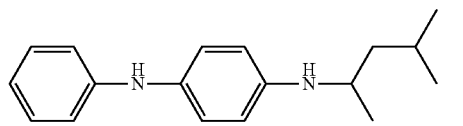

[N-1,3-Dimethylbutyl-N'-phenyl-p-phenylenediamine (6PPD)]

Amine-Based Anti-Aging Agent

[N-1,3-Dimethylbutyl-N'-phenyl-p-phenylenediamine (6PPD)]

Zinc oxide (at the final stage of kneading): Zinc oxide #2, as classified according to the JIS standards Quinoline-based anti-aging agent: Polymerized 2,2,4-trimethyl-1,2-dihydroquinoline, a trade name: "NONFLEX RD", available from Seiko Chemical Co., Ltd.

Sulfur: a trade name: "HK200-5", available from Hosoi Chemical Industry Co., Ltd.

A structural formula of the quinoline-based anti-aging agent is as follows.

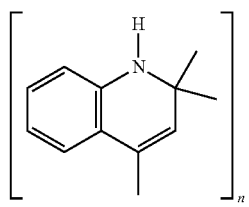

Quinoline-based anti-aging agent (1) Mechanical Strength (Breaking Strength)

A sheet obtained by punching out the obtained vulcanized rubber into a JIS No. 3 dumbbell shape was subjected to a tensile test with a tensile tester, TENSILON RTC-1225A, available from ORIENTEC Co., Ltd. in conformity with JIS K6250 under the conditions of a test temperature of 23° C. and a tensile speed of 300 mm/min, thereby measuring a breaking strength (Tb).

The breaking strength of each of the Examples and Comparative Examples was indexed by defining the breaking strength of Comparative Example 1 as 100. A tolerable range is 97 or more. It is expressed that as the index of the breaking strength is larger, the vulcanized rubber has a higher mechanical strength.

The results are shown in Table 2 ("Breaking resistance" column).

(2) Ozone Crack Resistance

The dynamic ozone deterioration test was performed under the conditions of an ozone concentration of 50 ppm, a temperature of 40° C., and an elongation of 20% in conformity with JIS K6259-1:2015 (Rubber, vulcanized or thermoplastic —Determination of ozone resistance—Part 1: Static and dynamic strain testing), and the number of days until the generation of a crack having a length of 1 mm was evaluated.

The number of days of each of the Examples and Comparative Examples was indexed by defining the number of days of Comparative Example 1 as 100. A tolerable range is 140 or more. It is meant that as the index of the number of days is larger, it took a longer number of days until the general of crack in the vulcanized rubber, that is, the ozone crack resistance was excellent.

The results are shown in Table 2 ("Ozone resistance" column).

TABLE 1

| | | |
|---|---|---|
| First stage of kneading | Natural rubber (NR) | 40 |
| | Polybutadiene rubber (BR) | 60 |
| | Carbon black | 35 |
| | Microcrystalline wax | 2 |
| | Hydroquinone compound of the kind or phenol-based anti-aging agent shown in Table 2 | Amount shown in Table 2 |
| | Process oil | 4 |
| | Stearic acid | 2 |
| | Zinc oxide | 1 |
| | Amine-based anti-aging agent | Amount shown in Table 2 |
| | Vulcanization retarder | 1 |
| Final stage of kneading | Zinc oxide | 2 |
| | Quinoline-based anti-aging agent | 1 |
| | Vulcanization accelerator package | 0.7 |
| | Sulfur | 1.6 |

(Parts by mass)

TABLE 2

| | Comparative Example 1 | Comparative Example 2 | Comparative Example 3 | Example 1 | Example 2 | Example 3 | Comparative Example 4 | Comparative Example 5 |
|---|---|---|---|---|---|---|---|---|
| Amine-based anti-aging agent | 3 | 4 | 10 | 3 | 3 | 3 | 3 | 3 |
| Hydroquinone compound 1 | 0 | 0 | 0 | 0.5 | 0.25 | 1 | 0 | 0 |
| Hydroquinone compound 2 | 0 | 0 | 0 | 0 | 0 | 0 | 0.5 | 0 |
| Hydroquinone compound 3 | 0 | 0 | 0 | 0 | 0 | 0 | 0 | 0.5 |
| Evaluation Break strength (index) | 100 | 98 | 73 | 100 | 100 | 97 | 85 | 74 |
| Ozone resistance (index) | 100 | 113 | 156 | 163 | 156 | 144 | 113 | 144 |

| | Comparative Example 6 | Comparative Example 7 | Comparative Example 8 | Comparative Example 9 | Comparative Example 10 | Comparative Example 11 | Comparative Example 12 |
|---|---|---|---|---|---|---|---|
| Amine-based anti-aging agent | 3 | 3 | 3 | 3 | 3 | 3 | 3 |
| Hydroquinone compound 4 | 0.5 | 0 | 0 | 0 | 0 | 0 | 0 |

TABLE 2-continued

| | | | | | | | |
|---|---|---|---|---|---|---|---|
| Hydroquinone compound 5 | 0 | 0.5 | 0 | 0 | 0 | 0 | 0 |
| Hydroquinone compound 6 | 0 | 0 | 0.5 | 0 | 0 | 0 | 0 |
| Hydroquinone compound 7 | 0 | 0 | 0 | 0.5 | 0 | 0 | |
| Hydroquinone compound 8 | 0 | 0 | 0 | 0 | 0.5 | 0 | 0 |
| Hydroquinone compound 9 | 0 | 0 | 0 | 0 | 0 | 0.5 | 0 |
| Phenol-based anti-aging agent | 0 | 0 | 0 | 0 | 0 | 0 | 0.5 |
| Evaluation Break strength (index) | 95 | 100 | 78 | 92 | 80 | 100 | 98 |
| Ozone resistance (index) | 106 | 100 | 131 | 113 | 125 | 106 | 100 |

As is noted from Table 2, in the vulcanized rubbers of the Examples, not only the index of the breaking strength is 97 or more, but also the index of the number of days in the ozone resistance is more than 140, so that both the high mechanical strength and the excellent ozone crack resistance are made compatible with each other.

On the other hand, in the vulcanized rubbers of the Comparative Examples, even if the ozone crack resistance is excellent, the mechanical strength is low, so that both the high mechanical strength and the excellent ozone crack resistance could not be made compatible with each other.

In the light of the above, it may be considered that when the vulcanized rubbers of the Examples are applied to a tread member, a side member, etc. of a tire, the tire having high mechanical strength and excellent ozone resistance is obtained.

INDUSTRIAL APPLICABILITY

In accordance with the present invention, it is possible to provide a rubber composition from which vulcanized rubber products in which both high mechanical strength and excellent ozone crack resistance are made compatible with each other are obtained. Furthermore, in accordance with the present invention, it is possible to provide a tire in which both high mechanical strength and excellent ozone crack resistance are made compatible with each other.

The invention claimed is:

1. A rubber composition comprising a rubber component including a diene-based rubber;
   a hydroquinone compound which has one alkyl group having 4 to 6 carbon atoms;
   an amine-based anti-aging agent, and
   sulfur,
   wherein the diene-based rubber comprises natural rubber and polybutadiene rubber (BR),
   wherein the sulfur content is 1 to 3 parts by mass per 100 parts by mass of the rubber composition, and
   wherein the content of the hydroquinone compound is 0.25 to 1 part by mass based on 100 parts by mass of the rubber component.

2. The rubber composition according to claim 1, wherein the content of the amine-based anti-aging agent is 3 to 10 parts by mass based on 100 parts by mass of the rubber component.

3. The rubber composition according to claim 1, wherein the hydroquinone compound has one tert-butyl group.

4. A tire comprising the rubber composition according to claim 1.

5. The rubber composition according to claim 2, wherein the hydroquinone compound has one tert-butyl group.

6. A tire comprising the rubber composition according to claim 2.

7. A tire comprising the rubber composition according to claim 3.

* * * * *